No. 878,529. PATENTED FEB. 11, 1908.
A. HOLMES.
LANDING NET.
APPLICATION FILED MAY 19, 1905.

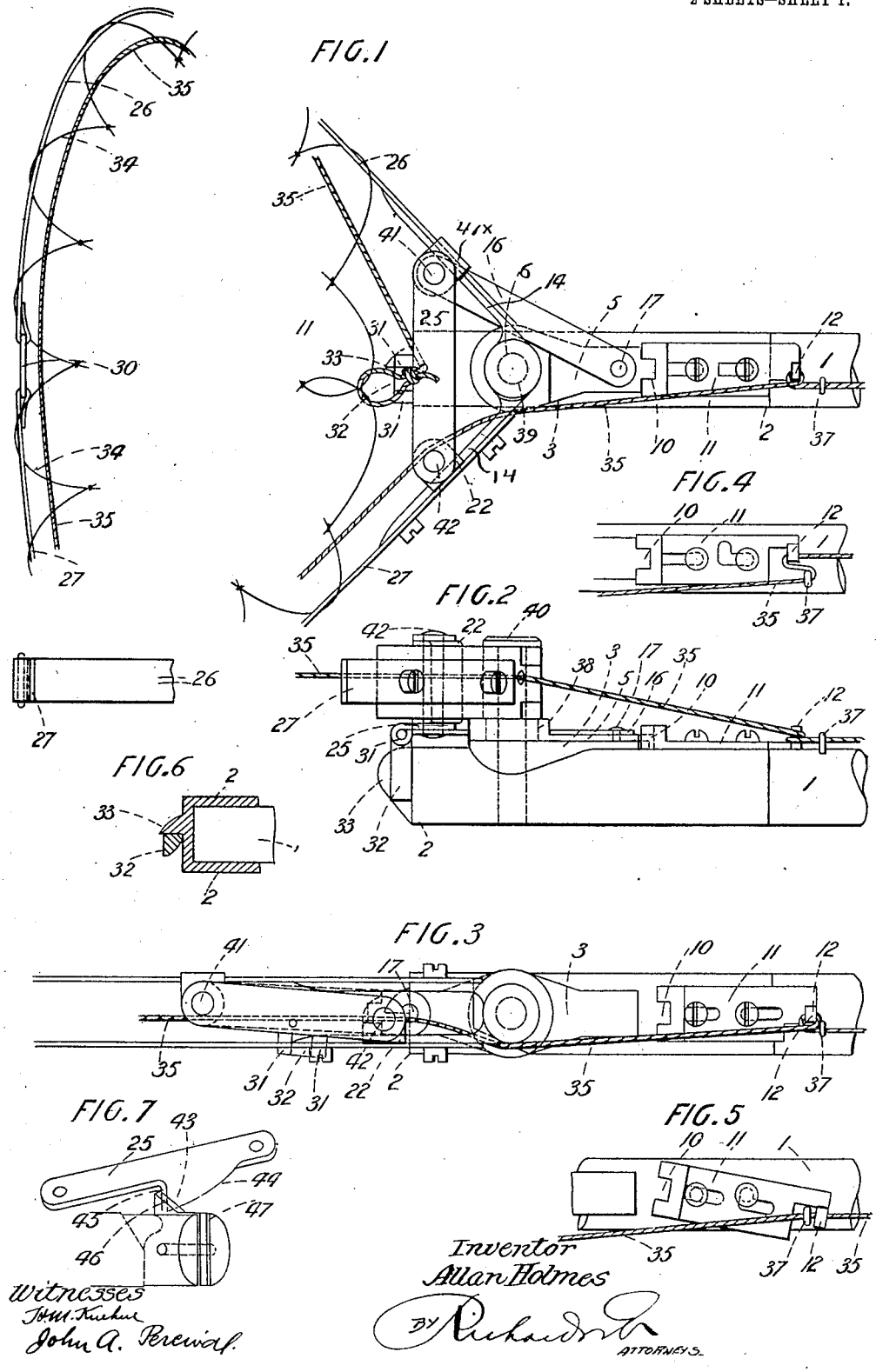

2 SHEETS—SHEET 2.

WITNESSES
W. P. Burke
W. H. Kennedy

INVENTOR
Allan Holmes
BY Richards
ATT'Y

UNITED STATES PATENT OFFICE.

ALLAN HOLMES, OF DUNEDIN, NEW ZEALAND.

LANDING-NET.

No. 878,529.      Specification of Letters Patent.      Patented Feb. 11, 1908.

Application filed May 19, 1905. Serial No. 261,217.

*To all whom it may concern:*

Be it known that I, ALLAN HOLMES, of Dunedin, New Zealand, solicitor, have invented certain new and useful Improvements in Landing-Nets, of which the following is a specification.

My invention relates to anglers' landing nets of the kind wherein the net-holding frame is adapted to be collapsed and folded along the handle for carrying and to be distended and locked in position for use, the change of form and position of the frame being produced by a swinging movement of the frame substantially in its own plane and the locking and release of the locking devices being effected automatically by the action of gravity.

The improvements consist of the features and combination and arrangement of parts hereinafter described and more particularly pointed out in the claims.

Figure 8:
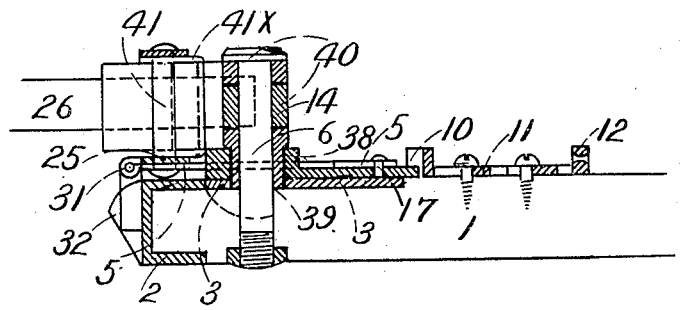
Figure 9:
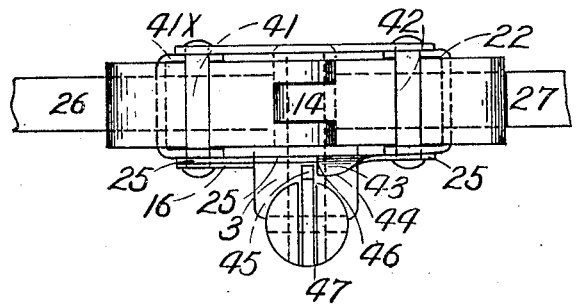
Figure 10:
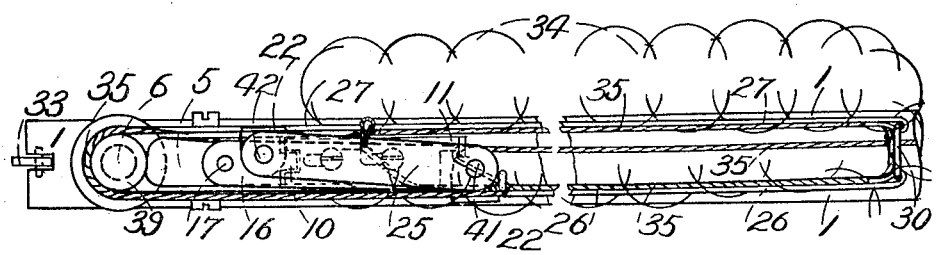

In the accompanying drawings:—Figure 1. is a plan view of the landing net distended. Fig. 2. is a side view of Fig. 1. the net being omitted. Fig. 3. is a plan view showing the position of the collapsible bands when it is desired to draw the mouth of the net together. Fig. 4. is a view showing the apparatus for disengaging the frame when extended and the method of attaching the cord which operates the apparatus. Fig. 5 is a view showing the apparatus for disengaging the frame, when operated by the cord. Fig. 6. is a sectional view of the tongue, nose, part of the ferrule and part of the handle. Fig. 7. is a perspective view of an alternative method of locking the frame when distended. Fig. 8 is a longitudinal section of Fig. 2. Fig. 9 is an end view of the apparatus showing the alternative method of locking the frame as in Fig. 7. Fig. 10 is a plan view showing the apparatus in the closed position for carrying.

At the lower end of the handle (1) is a ferrule (2) on which is a bed plate (3). At the lower end of the bed-plate (3) is a disk (38) either separate or forming part of the bed-plate of sufficient height to allow the pieces or bars hereinafter described to open and close under the frame hereinafter described.
At the lower end of the bed plate is a circular aperture (39) through which and a similar aperture in the said disk if separate, passes a pin (6) which I call the main pin on which the frame revolves.
The frame is composed of two members (26) and (27) which may be spring bands of any suitable material. The bands at the upper end terminate in knuckles (14) intersecting like those of a hinge which are pivoted upon the main pin between the said disk and the head (40) of the pin. At the lower end the bands are joined so as to allow them to come together or open out by an ordinary hinge (30). The frame is closed and opened out and disengaged when opened out by the means next hereinafter mentioned.

On the disk (38) is pivoted a bar or arm (5) which I call the first arm, the part surrounding the disk being of slightly less height than the disk so as to allow this arm to revolve under the frame. The rest of this arm is about equal in thickness to the second and third arms hereinafter mentioned. At the upper end of the first arm (5) when the frame is folded along the arm handle it engages with a catch (11) to be hereinafter described, which I call the back catch.

The bands 26, 27 are brought together by pushing down the arm 16 to its full extent. Both arms are then revolved on their centers 6 until they lie along the handle 1. The back catch 11 holds them in position until it is desired to use the net.

The end of the arm fits into a notch (10) in the back catch and is bent down. Towards the upper end of the first arm 5 is a bolt or rivet (17) which passes through a circular aperture in the first arm and a similar aperture at one end of another piece (16) or bar placed above it which I call the second arm, so as to allow such second arm to revolve on such bolt or rivet. The bolt or rivet ought to be made so as to allow the lower end of the third arm (25) to revolve on top of and lie along the second arm when the frame is folded along the handle. At the other end of the second arm is a pin (41) passing through a circular aperture in the second arm and also passing through a circular aperture in another piece (25) or bar which I call the third arm placed above the second arm. At the other end of the third arm is a circular aperture through which passes a pin (42) or bolt by which the third arm is attached to the left band of the frame (22) or a lug or bracket thereon.

The centers of the apertures in the second and third arms should be equidistant and the centers of the apertures in the first arm and in the disk such that when the first arm is held by the back catch and the frame extended at the end of the handle a line bisecting the length of the handle will bisect the third arm when it revolves to a position at right angles to the middle line of the handle. This position also determines the point on the left band of the frame at which the third arm should be attached to it. The thickness of the three arms taken together exclusive of the portion of the first arm around the disk should not exceed the thickness of the disk which holds the frame above them so that they may work underneath it. The height of the pin (41) passing through the second and third arms is such that a guide 41ˣ can be pivotally attached thereto to pass round and travel on the right band. Pivotally attached to third arm (25) by the lugs (31) is a piece which I call the tongue (32) which is carried by the third arm and when it reaches a projecting piece (33) at the end of the handle which I call the nose, rises over it and locks on the other side of it. The right hand side of the nose being suitably sloped and the left hand kept flat for the purpose of stopping the frame in its downward revolution. The left side of the tongue may also be suitably sloped and the right hand must be kept flat for the same purpose. To effect the locking of the tongue 32 on the nose 33 the revolution of the frame can be stopped by arranging the right side of the portion of first arm (5) surrounding the disk (38) so as to stop the second arm (16) at the point at which it will cause the third arm (25) to take the position at right angles to the handle hereinbefore mentioned, or the locking can be effected by making the third arm (25) stop similarly against the lower end of the first arm (5).

The terms right and left are used with reference to the members of the frame as extended at the end of the handle.

When being carried the bands 26, 27, of the frame come together along the handle the back catch 11 being set so as to hold the first arm 5. When wanted for use the handle is at first inclined to the right, the hands inclining a little downwards so that the bands 26, 27, revolve outwardly and as they revolve the handle (1) is so turned as to raise the apex of the bands and cause them to revolve onwards till the second arm (16) is stopped as before described and the tongue (32) drops into its place on the left side of the nose (33). The frame is then extended for use, the extension being effected by the third arm (25) being drawn out by the left band and the pin (41) connecting the second arm (16) and third arm (25) keeping back the second arm (16). The extension may also be effected by giving the handle held pointing downwards a smooth swing or throw from right to left which causes the frame to revolve stop and lock as described.

When extended the frame may be disengaged and again collapsed by drawing back the sliding piece (11) or bar lying along the handle in a line with the first arm. This bar may be secured to the handle by two screw nails with heads passing through longitudinal slots in the bar of sufficient length to allow the bar when drawn back to disengage from the first arm (5). It can be drawn back by means of a cord (35) passing upwards through a raised eye (12) at the upper end. Preferably the cord (35) should pass first through an eye (37) on the handle and then be led back below the eye (12) on the bar and passed upwards through such eye (12) and along the handle Fig. 4. If the cord (35) is extended downwards from the eye (37) on the handle and through the upper row of the meshes of the net (34) on the frame and the end so passing fastened at the throat of the frame the drawing of the cord will not only draw back the slide but will if continued draw in the net on the bands which have now come together till they reach the upper end of the frame. The slots and the notches placed on the upper slot of the sliding bar and above it allow the eye on the bar to pass the eye on the handle and come into line above it, Fig 5.

An alternative mode Fig. 7 of the locking frame is to make the third arm (25) carry a triangular shaped piece (43) or tooth pointing downwards with sloping face (44) toward the left and vertical face (45) to the right and so placed as to pass over depress one end and engage against the further side of a hanging piece (46) pivoted in a vertical longitudinal slot (47) at the end of the handle (1). The said hanging piece (46) or hanger having the outer side heavier than the inner and so as to raise the inner side to project above the level of the handle but so that the third arm (25) may travel to such projection portion and by means of said triangular part depress that end of the hanger. This projection is sloped downwards to the level of the handle at this point, and the sloping face (44) of the triangular piece on the third arm (25) meets and travels over it by depressing this end of the hanger which when it is passed over rises again and the vertical face (45) of the triangular piece then locks against it. The hanger must be so arranged that the heavy side can raise the light side only so far as to allow of the movement before described which can be effected by making it or part of it engage against any part of the slot so as to keep it sitting in the required position. The frame may be unlocked by turning the upper side down or part of the heavy side of the hanger may be made to project from the slot for the purpose of unlocking by hand. When turned upside down and the bands are depressed to the left they will revolve back so as to lie along the handle.

Having now described my invention, what

I claim as new and desire to secure by Letters Patent is:—

1. Improvements in landing nets comprising in combination a handle, a pivot pin thereon, a collapsible net frame consisting of two similar bands having one pair of ends linked together and the other pair of ends hinged to said pivot pin whereby the frame is revoluble on the pivot pin, a link pivotally secured by one end to the hinged end of one band near the pivot pins and pivotally secured by its other end to a bracket embracing and slidable on the other band, a link pivotally secured by one end to said bracket and by its other end to said handle and mechanism actuated by gravity for locking the frame in its extended position substantially as described.

2. Improvements in landing nets comprising in combination, a handle, a pivot pin thereon, a collapsible net frame consisting of two similar bands having one pair of ends linked together and the other pair of ends hinged to said pivot pin whereby the frame is revoluble on the pivot pin, a connecting link pivotally secured by one end to the hinged end of one band near the pivot pin, and pivotally secured by its other end to a bracket embracing and slidable on the other band, a link pivotally secured by one end to said bracket and by its other end to said handle, a projection on the end of said handle, and a hanging tongue hinged to said connected link and adapted to engage said projection substantially as described.

In witness whereof I have hereunto set my hand in presence of two witnesses.

ALLAN HOLMES.

Witnesses:
 A. J. PARK,
 R. C. PARK.